Patented Feb. 7, 1933

1,897,016

UNITED STATES PATENT OFFICE

WILLIAM H. ALTON, OF NEW YORK, N. Y., ASSIGNOR TO R. T. VANDERBILT COMPANY, OF NEW YORK, N. Y., A CORPORATION OF NEW YORK

PLASTIC WALL COATING

No Drawing.   Application filed December 21, 1928.   Serial No. 327,753.

This invention relates to a composition of matter adapted for making plastic material. More particularly the invention is concerned with material for use as a wall coating, for producing the so called textured finishes, that is wall coatings having uneven surfaces resembling the French, Moorish, travertine, or other finishes found in old buildings of Europe, or original surface designs produced by trowelling or brushing the material on the wall while it is in a plastic state.

A number of materials have already appeared on the market intended to be used for producing such "textured" finishes, but these materials have been uniformly expensive due to the necessity for using such costly materials as mica, casein, etc. Extended investigations have been and are still being conducted by many workers in attempts to find a formula by which a "texturing" material of this nature can be made at a lower cost. The results of these efforts heretofore, however, have seemed merely to confirm the general belief that a satisfactory material could not be made without the use of expensive mica.

It is necessary for these plastics to adhere to almost any kind of wall surface both while plastic and after drying. It must be of a consistency such that it can be applied with a brush without "drag," which would tire out the arm of the person applying it; that is it must flow freely from the brush; and yet it must not flow on the wall. It has been found by experience and experiment that adhesive binders such as casein or animal glue were best adapted to give the necessary qualities of adhesion to any surface and cohesive strength and rigidity after drying. It was found, however, with these binders that the shrinkage with the necessary thicknesses was so great that the coating would crack while drying, like the surface of a mud puddle, forming a pattern like an alligator skin. It was found that mica would overcome the undesirable effects of this shrinkage and permit the drying without objectionable cracking, but no other material had been found prior to my invention which could replace mica.

The use of binders such as animal glue and casein has additional disadvantages. For example, these materials are ordinarily sold in the form of dry powders to be mixed with water before application, but these binders are not readily soluble in water, and it is necessary therefore to include in the composition a small amount of alkali, ordinarily an ammonium compound, which will promote the dissolving. The presence of this alkali is objectionable, not only because of the unpleasant odor of ammonia, but because it attacks varnished or painted surfaces and therefore requires elaborate precautions during its application to keep it from coming in contact with such finishes. Even with the use of alkali, it has been necessary with the materials which have been on the market prior to my invention to stand over night after mixing with the water. This has caused a very considerable waste of material, since it is practically impossible to determine beforehand the exact requirements of a job; and rather than risk running out of material and having to wait until the next day to finish the job, a considerable excess is always made up.

I have discovered, after a study of many different adhesive binders in the presence of various fillers, that the quality of flowing easily from a brush or trowel and yet holding its form without slumping or flowing is best attained by the use of an adhesive which forms with water a semi-gel, that is, a colloidal structure capable of holding its form and yet not elastic like the gels formed by glue or gelatine. I have found that the so called "short" adhesives, which separate without forming strings, are better than the "long" adhesives such as glue, casein and alkali treated starches, which string out into long threads. Furthermore I have found that, if, adhesives are chosen which have a relatively low shrinkage, the mica can be dispensed with and equally satisfactory materials produced with the cheaper fillers. These discoveries are particularly remarkable since it has always been thought that the "short" adhesives and particularly vegetable adhesives could not be used in this type of composition.

The adhesive which I have found best suited for this purpose is a water soluble (or dispersible) residue remaining after separation of starch and gluten from cereals such as wheat. The nature of this material and the manner of preparing it is more fully set forth in the United States patents to Hoyt, No. 709,544, dated Sept. 23, 1902, and No. 710,461, dated Oct. 7, 1902. The chemical nature of this material is not precisely known, but it is believed to be a vegetable albuminous material, altho it may also contain some starch and other materials. This material readily absorbs a large amount of water forming a semi-gel, soft and readily formed into any shape, very adhesive and yet not at all "stringy". When this material is mixed with suitable materials it retains its properties of forming at once, without need for standing with the water, this soft semi-gel, readily brushed out onto any surface, with almost no drag, and self sustaining without tendency to slump or flow.

It is an advantage of this adhesive that it will absorb a relatively large amount of water after reaching the semi-gel stage without seriously impairing its qualities. This permits its use by inexperienced persons without danger from adding too much water.

The fillers which may be used in the practice of my invention include magnesium silicates such as talc and aluminum silicates, particularly pyrophyllite. The latter material I have found to possess remarkable advantage for the compositions of this invention. Its whiteness gives to the dried coating a particularly desirable color, while its platelet form gives to the wet material plastic qualities such as ease of working, perfect retention of form, covering power, etc., and to the dried coating a satin finish and a softness of outline which far excels anything which has been attained with other materials either by my invention or by the prior art. The platelet form of the pyrophyllite particles seems also to make this material share with plate talc and with mica freedom from shrinkage when used with an adhesive binder of this invention.

The following examples will serve to illustrate the invention:

1.—Ninety parts by weight of pyrophyllite of a size to pass through a sixty mesh screen are mixed with ten parts of a dry powdered adhesive made according to the Hoyt patent referred to above. The resulting powder can be packaged and stored without deterioration. In this form the material occupies only about half the bulk of the present commercial "plastic paints" and yet its covering power is no less. When mixed with sufficient water, this material forms almost at once a smooth, soft, gel-like paste which can be applied to the wall surface with almost no drag. It may be built up to any desired thickness by merely brushing on one brushful on top of another, the material flowing freely from the brush without pulling away that which was laid on by the preceding stroke. Or if desired the material may be applied with a trowel. When it is built up to the desired thickness it may be given any desired form as by brushing or troweling the surface. When dry it possesses considerable elasticity which gives it resistance against cracking or chipping.

2.—Ninety parts by weight of plate magnesium talc of a size to pass through a fifty to sixty mesh screen are mixed with ten parts of the same adhesive binder. This mixture can be stored and formed into a plastic by simple addition of water in the same manner as with the material of Example 1. The plastic made with this mixture, however, will not retain such sharp outlines as will the plastic of Example 1, and it has a slight tendency to "pick" away from the wall while being worked with a brush, which is not present with the pyrophyllite plastic.

The problem is one of colloidal behavior, and success depends quite as much on the proper choice of fillers as on the choice of an adhesive binder. I have found that fillers which have a flat cleavage and particularly those whose particles are in the form of platelets such as pyrophyllite, mica, or talc are the most satisfactory, while those which have a fibrous character like asbestos and fibrous talc are not suitable. Materials which are not entirely satisfactory when used alone, may be used together with materials such as those described in the examples, and may serve merely as diluents, or in some cases may improve the qualities of the mixture.

The particle size is important. The material should in general pass through a sixty mesh screen, and a large part of it should be held back on a two hundred mesh screen. Within these limits the best size will depend upon the particular filler which is used and on the results desired. The material should not be too closely graded, as the larger particles seem to be necessary to prevent lumping, while the smaller particles give desirable body and covering power.

Alkalinity, as would be expected in any colloidal problem, is also important. As little as one-tenth of one per cent of caustic or a corresponding amount of alkaline fillers will materially change the plastic properties of the mixture, making it flow more readily.

It will be understood from the above that my invention involves a radical departure from the practice and beliefs of the prior art. Where it has been thought heretofore that "long" binders such as had been used with kalsomine and cold water paints are desirable, I have found that the requirements of kalsomine and of plastic paints are almost diametrically opposite; where kalsomine is required to flow so as to smooth out the brush marks, plastic paints must preserve those brush marks; where kalsomine must not build up any great thickness with successive strokes over the same area, this is a highly desirable property in plastic paints; and where kalsomine is applied in such thin films that shrinkage is not of great importance, it is of prime importance in plastic paints. These differences have of course been recognized prior to my invention, but where in the prior art it has been thought that expensive fillers such as mica must be used to effect these differences, I have found that by using a suitable adhesive binder the range of fillers can be very greatly increased, and both binder and filler may be cheaper than has been available heretofore. Finally, I have found that when pyrophyllite is used as the filler the results achieved may be superior to anything which has been heretofore available.

I claim:

1. A plastic composition in dry pulverulent form, adapted for use in forming textured wall coatings, said composition comprising the herein described adhesive, being a residue from cereal flour after removal of starch and gluten which is readily soluble in water and when so dissolved forms a "short" binder which is not at all stringy, and a pulverulent mineral filler the particles of which are in platelet form, said dry composition having the property, when added to water, of readily forming, without need of standing, a smooth gel-like plastic paint which flows freely from the brush without flowing freely on the surface to which applied, which enables textured finishes to be readily obtained and which dries without objectionable shrinking and cracking.

2. A plastic composition in dry, pulverulent form, adapted for use in forming textured wall coatings, said composition comprising the herein described adhesive, being a residue from cereal flour after removal of starch and gluten which is readily soluble in water and when so dissolved forms a "short" binder which is not at all stringy, and pyrophyllite, the particles of which are in platelet form, said dry composition having the property, when added to water, of readily forming, without need of standing, a smooth gel-like plastic paint which flows freely from the brush without flowing freely on the surface to which applied, which enables textured finishes to be readily obtained and which dries without objectionable shrinking and cracking.

In testimony whereof I affix my signature.

WILLIAM H. ALTON.